(12) United States Patent
Eschbach

(10) Patent No.: US 6,375,216 B1
(45) Date of Patent: Apr. 23, 2002

(54) SIDE GAS BAG RESTRAINT SYSTEM

(75) Inventor: Ernst Eschbach, Dachau (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/564,813

(22) Filed: May 4, 2000

(30) Foreign Application Priority Data

May 4, 1999 (DE) ..................................... 299 07 912 U

(51) Int. Cl.$^7$ .............................................. B60R 21/22
(52) U.S. Cl. .................................. 280/730.1; 280/730.2
(58) Field of Search ........................... 280/730.1, 730.2, 280/749, 753

(56) References Cited

U.S. PATENT DOCUMENTS

| | | | |
|---|---|---|---|
| 5,333,898 A | * 8/1994 | Stutz ........................ | 280/730 A |
| 5,462,308 A | * 10/1995 | Seki et al. .................. | 280/749 |
| 5,480,181 A | * 1/1996 | Bark et al. ................. | 280/730.2 |
| 5,605,346 A | * 2/1997 | Cheung et al. ........... | 280/728.2 |
| 5,660,414 A | * 8/1997 | Karlow et al. ............. | 280/749 |
| 5,865,462 A | * 2/1999 | Robins et al. ............. | 280/730.2 |
| 5,924,723 A | * 7/1999 | Brantman et al. ......... | 280/730.2 |

FOREIGN PATENT DOCUMENTS

| | | | | |
|---|---|---|---|---|
| DE | 4307175 A1 | * 9/1993 | ............ | B60R/21/16 |
| DE | 19654490 A1 | 6/1998 | | |
| DE | 19704051 A1 | 8/1998 | | |

* cited by examiner

*Primary Examiner*—Lanna Mai
*Assistant Examiner*—Christopher Buchanan
(74) *Attorney, Agent, or Firm*—Tarolli, Sundheim, Covell, Tummino & Szabo L.L.P.

(57) ABSTRACT

A side gas bag restraint system for a vehicle having a roof frame and vehicle columns extending upwardly to the roof frame and having side windows, the roof frame and the vehicle columns being covered by at least one lining, is described. The system comprises a curtain-like gas bag covering at least one side window of the vehicle to at least a major extend in an unfolded state of the gas bag and being attached to the vehicle at fastening points, and comprises an elongated guide device to which the gas bag is displaceable fastened and along which the gas bag moves itself on unfolding of the gas bag. The guide device is arranged behind a lining and extends downwardly along a vehicle column in the unfolded and in the folded state of the gas bag. The guide device has two stationary fastening ends at which the guide device is fixed to the vehicle and is constructed so as to be so flexible that the gas bag draws the guide device out from the lining on unfolding of the gas bag. The gas bag is tensioned between its fastening points and the guide device when unfolded.

12 Claims, 1 Drawing Sheet

SIDE GAS BAG RESTRAINT SYSTEM

TECHNICAL FIELD

The invention relates to a side gas bag restraint system for a vehicle having a roof frame and vehicle columns extending upwardly to the roof frame and having side windows, the roof frame and the vehicle columns being covered by at least one lining.

BACKGROUND OF THE INVENTION

Side gas bags having a large area, also known as window bags, are intended to restrain the head of the occupant in a side impact or in a roll-over of the vehicle, by covering the side windows. At the same time the side gas bag is to be kept as stable as possible in order to be able to take up the forces applied by the impacting head of the occupant. The extremely short unfolding time which is available within which the gas bag must be completely unfolded and optimally positioned is also very problematic. In order to shorten this positioning and the unfolding process or make them more able to be predetermined, the EP 0 847 904 A1 suggests arranging one guide rod along the roof frame and one along the B-column, the rods each provided behind a lining. A triangular side gas bag is then to be tensioned between these guide rods, on which it is fastened so as to be slidably displaceable. In order to accelerate the unfolding, additional drives are provided, engaging directly on the gas bag, which are intended to engage on the gas bag and pull it out from its covering. Such additional drive elements are, however, very expensive and difficult to accommodate in the vehicle. The guide rods arranged behind the lining do not offer an optimum reliability in function in the case of restraint. With the impact of the head onto the gas bag in fact the deformation of the guide rods can occur. In addition, it is disadvantageous that the gas bag must move along between the lining, covering the rods to the passenger compartment, and the roof frame or the B-column. As the lining must be arranged very close to the roof frame or the B-column, in order to avoid intrusive gaps, the gas bag must overcome an increased friction in order to move along between the lining and the roof frame or the B-column.

DE 196 54 490 A1 contains one embodiment according to which a flexible, closed ring circumscribes a thick, hose-shaped gas bag in the circumferential direction, the ring being fixed to the gas bag at attachment points. Two tensioning straps extend from the ring in opposite directions to the A- and the B-pillar of the vehicle. In order to achieve a tensioning effect in the unfolded state of the gas bag, the geometry of the gas bag and the length of the tensioning straps have to be exactly adapted to the geometry of the vehicle. Further, as the gas bag and the tensioning straps are extending adjacent to each other behind the lining, there exists a risk that the gas bag intertwines with the straps or becomes entangled resulting in a an incomplete or decelerated unfolding process.

BRIEF SUMMARY OF THE INVENTION

The invention relates to a side gas bag restraint system in which the guide for the gas bag is able to be produced at an extremely favorable cost and a slight resistance is offered to the unfolding of the gas bag. The system according to the invention ensures a complete, fast unfolding of the gas bag.

The side gas bag restraint system according to the invention comprises a curtain-like gas bag covering at least one side window of the vehicle to at least a major extend in an unfolded state of the gas bag and being attached to the vehicle at fastening points, and comprises an elongated guide device to which the gas bag is displaceable fastened and along which the gas bag moves itself on unfolding of the gas bag. The guide device is arranged behind a lining and extends downwardly along a vehicle column in the unfolded and in the folded state of the gas bag. The guide device has two stationary fastening ends at which the guide device is fixed to the vehicle and is constructed so as to be so flexible that the gas bag draws the guide device out from the lining on unfolding of the gas bag. The gas bag is tensioned between its fastening points and the guide device when unfolded. According to the invention both fastening ends of the guide device are stationary, i.e. vehicle-fixed so that the movement of the guide device is limited when the gas bag is inflated.

The guide device is to be exposed by the gas bag itself such that the lining no longer acts as an obstacle during the unfolding of the gas bag and the sliding of the gas bag along the guide device. The guide device is preferably drawn through between the lining and the sheet metal part of the vehicle on which the lining is arranged, at least over the part along which the gas bag slides.

The guide device is preferably a flexible belt with stationary fastening ends in the vehicle. The gas bag tensions the flexible belt in the inflated state between the fastening ends, so that the flexible belt stabilizes and holds the gas bag.

According to one development, the guide device extends in a non-linear manner between its stationary fastening ends, arrested on the vehicle, in the non-unfolded state of the gas bag, whereby a withdrawal of the guide device out from the lining is made possible.

In the unfolded state, the gas bag extends from the at least one stationary fastening point on such vehicle column at which the guide device is not arranged to and along the roof frame to pass at least one stationary fastening point on the roof frame and extends further to an upper end of the column along the guide device extends. Thus, the gas bag cannot intertwine with the guide device as both are not arranged adjacent to each other behind the lining.

According to one development of the invention, provision is made that the gas bag is a gas bag covering a side window of the vehicle and the guide device extends along a vehicle column (A-, B- or C-column). For the optimum guidance of the gas bag during the unfolding, the guide device is preferably arranged behind the lining of the B-column so as to run vertically up to the roof frame. Here, the guide device extends at its upper end a further distance along the roof frame. This end is already drawn out from the lining at the start of the unfolding process through the gas bag which is folded along the roof frame.

The gas bag can be connected with the guide device at several points, in particular, however, in the region of its lower edge corner region in the folded state, where a slide connection (e.g. an eye) is arranged.

An advantageous and simple possibility for drawing the guide device out from the lining through the gas bag consists in positioning a connecting line between the fastening ends of the guide device at least in the region of the unfolded gas bag outside the lining.

According to the preferred embodiment of the invention, the gas bag is tensioned in the unfolded state along its lower edge between a fastening point on the vehicle and the guide device.

DETAILED DESCRIPTION OF THE PREFERRED EMBODIMENT

Figure 1:
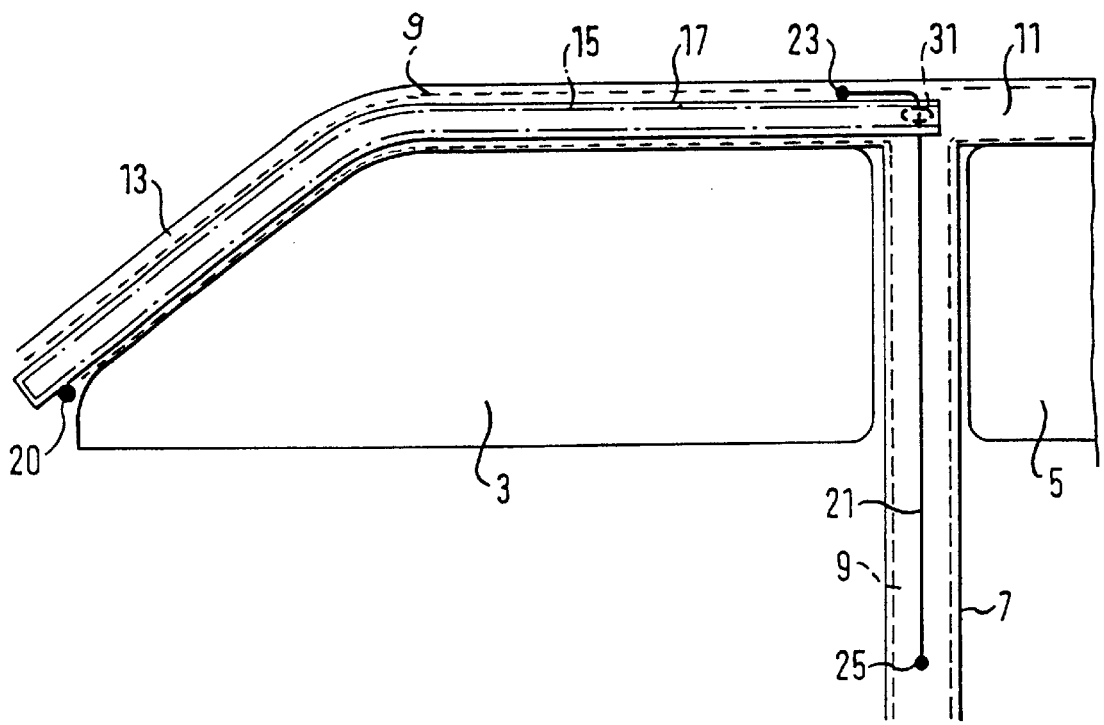
FIG. 1 shows a diagrammatic side view of an embodiment of the side gas bag restraint system according to the invention, installed in the vehicle and in the non-activated state.

In FIG. 1 inter alia the front right-hand side window 3 of a vehicle is illustrated. The rear side window is designated by 5 and the so-called B-column of the vehicle is designated by 7. A conventional plastic lining 9, which completely covers the B-column to the passenger compartment, is illustrated by broken lines. This lining 9 extends up to the roof frame 11 which continues forward into the A-column 13. Along the roof frame 11 and the A-column 13, a folded gas bag 15 having a large area extends from the B-column 7, which gas bag 15 is illustrated by dot-and-dash lines. The gas bag 15 is accommodated in its illustrated folded state in a housing 17 and is arrested on the roof frame 11 at several stationary, vehicle-fixed fastening points 19 which can be better seen in FIG. 2. At its lower end in the region of the A-column 13, in addition a fastening point 20 is provided for the gas bag 15, to which it is connected with the A-column 13. Thus, in the unfolded state, the gas bag 15 extends from the stationary fastening point 20 on the A-column to and along the roof frame to pass stationary fastening points 19 on the roof frame and extends further to an upper end of the B-column.

A guide device in the form of an elongated flexible textile belt 21 extends in the state shown in FIG. 1 along the B-column behind the lining 9 upwards to the roof frame. At the transition from the B-column 7 to the roof frame 11, the belt 21 forms a bend and extends a further short distance along the roof frame 11 toward the A-column. The flexible belt has an upper fastening end 23 which is stationary relative to the vehicle and also has a lower fastening end 25 which is likewise stationary relative to the vehicle, with which it is fastened to the roof frame 11 and to the B-column 7, respectively. Between the fastening ends 23, 25, the belt 21 extends in a non-linear manner in the non-activated state of the gas bag restraint system which is shown, owing to the bend at the upper end.

Figure 2:
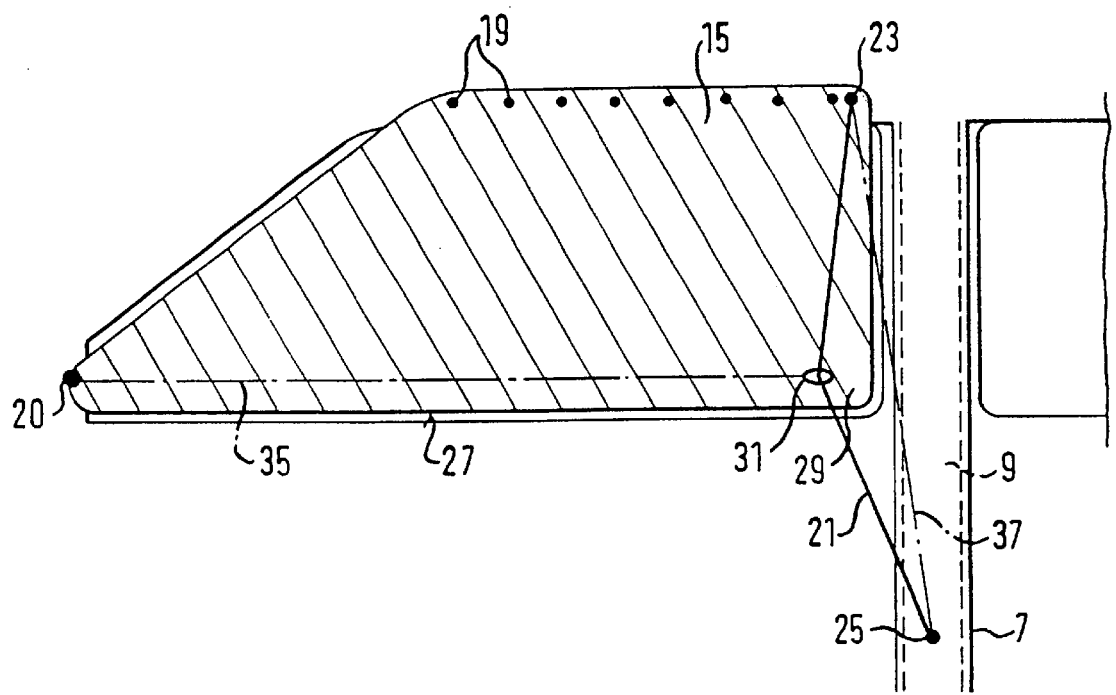
FIG. 2 shows a diagrammatic side view of the side gas bag, illustrated in FIG. 1, with unfolded gas bag.

In relation to the unfolded state shown in FIG. 2, the gas bag 15 has a lower edge 27 and also a rear, lower edge corner region 29. In this edge corner region 29 a slide eye 31 is provided, through which the belt 21 extends and which defines a movable or displaceable fastening point of the gas bag.

On unfolding of the gas bag by a gas generator, not shown, accommodated in the region for example of the A-column or at another suitable site, the gas bag 15 emerges from its housing 17 and endeavors to unfold in all directions. The flexible belt 21 as guide device, however, substantially codetermines the unfolding direction. The gas bag is to unfold as quickly as possible downwards and in as predeterminable a manner as possible, so that it covers the side window 3 as quickly as possible. During the unfolding of the gas bag, the latter shortens in its longitudinal extent (longitudinal direction of the vehicle). Thereby, already at the start of its unfolding process, it draws the flexible belt 21 via the eye 31 through between the lining 9 of the B-column 7 and the B-column 7 itself and also through between the lining of the roof frame 11 and the roof frame 11 toward the side window 3. The belt 21 thereby lies at least in the region of the side window 3 outside these linings. The gas bag unfolds further downwards and the eye 31 likewise slides down on the belt 21 until the gas bag 15 is completely unfolded (FIG. 2).

As shown in FIG. 2, the gas bag is tensioned between its fastening points 19, 20, 31 and the flexible belt 21. The flexible belt 21 serves not only for guidance but also as anchoring of the gas bag. The gas bag 15 is coordinated with the position and the length of the flexible belt 21 such that the flexible belt 21 is tensioned in the state of the gas bag shown in FIG. 2, whereby a stable unit of gas bag and flexible belt is produced. In the region of the lower edge 27, a horizontal tension line 35 extends between the fastening point 20 and the eye 31, which line 35 is represented in dot-and-dash lines. The hatching is intended to represent the taut surface of the gas bag 15. It can be seen thereby that practically the entire gas bag 15 is available as a taut restraint surface.

As already explained, it is important that for the rapid unfolding of the gas bag 15 whilst sliding along the flexible belt 21, no high frictional resistance has to be overcome. This is achieved by the withdrawal of the flexible belt 21 from the lining at least in the region of the unfolded gas bag. Practically, this becomes possible inter alia in that an imaginary connecting line 37 between the fastening ends 23, 25 lies at least in the region of the unfolded gas bag outside the lining 9. Instead of the so-called A-B-gas bag which is shown, i.e. a gas bag which extends from the A-column 13 to the B-column 7, of course also a so-called A-B-C- or a B-C-gas bag can be tensioned and guided by the guide device which is shown. The gas bag which is shown has a large, taut surface and therefore offers protection from contact with the side window or from the head or the arms emerging from the vehicle in a side impact or a roll-over of the vehicle.

The guide device may also extend along the A- or the C-column of the vehicle.

What is claimed is:

1. A side gas bag restraint system for a vehicle having a roof frame and vehicle columns extending upwardly to said roof frame and having side windows, said roof frame and said vehicle columns being covered by at least one lining, said system comprising an inflatable curtain-like gas bag covering at least one side window of said vehicle to at least a major extent in an unfolded inflated state of said gas bag and being attached to said vehicle at fastening points, an elongated guide device to which said gas bag is displaceably fastened and along which said gas bag moves itself on inflation of said gas bag and due only to inflation of said gas bag, said guide device being arranged behind a lining in a folded state of said gas bag and extending downwardly along a vehicle column in the inflated and in the folded state of said gas bag, said guide device having two stationary fastening ends at which said guide device is fixed to said vehicle, said guide device being constructed so as to be so flexible that said gas bag draws said guide device out from said lining on inflation of said gas bag, and said gas bag being tensioned between its fastening points and said guide device when inflated.

2. The side gas bag restraint system according to claim 1, wherein said gas bag has fastening points stationary with respect to the vehicle and has at least one fastening point movable with respect to the vehicle, said gas bag being tensioned between its stationary and movable fastening points.

3. The side gas bag restraint system according to claim 2, wherein said fastening points which are stationary with respect to the vehicle are arranged on said roof frame and a vehicle column at which said guide device is not arranged.

4. The side gas bag restraint system according to claim 3, wherein, in the unfolded state, said gas bag extends from said at least one stationary fastening point on such vehicle column at which said guide device is not arranged to and along said roof frame to pass at least one stationary fastening point on said roof frame and extends further to an upper end of said column along which said guide device extends.

5. The side gas bag restraint system according to claim 1, wherein said guide device is a flexible belt, said gas bag tensioning said flexible belt between said fastening ends when unfolded.

6. The side gas bag restraint system according to claim 1, wherein said guide device extends not in a straight line between its fastening ends when said gas bag is folded.

7. The side gas bag restraint system according to claim 1, wherein said guide device, in the folded state of the gas bag, extends behind a lining of a B-column of said vehicle vertically up to said roof frame.

8. The side gas bag restraint system according to claim 1, wherein said guide device extends at its upper end, in the folded state of said gas bag, a distance along said roof frame.

9. The side gas bag restraint system according to claim 2, wherein said gas bag has a lower edge corner and, in the unfolded state, has a slide connection with said guide device in a region of its lower edge corner, said slide connection defining said fastening point movable with respect to said vehicle.

10. The side gas bag restraint system according to claim 9, wherein a connecting line between said fastening ends of said guide device lies, in the region of said unfolded gas bag, outside said lining.

11. The side gas bag restraint system according to claim 1, wherein said gas bag has a lower edge and, in the unfolded state, is tensioned along its lower edge between a fastening point and said guide device.

12. A side gas bag restraint system for a vehicle having a roof frame and vehicle columns extending upwardly to said roof frame and having side windows, said roof frame and said vehicle columns being covered by at least one lining, said system comprising:

an inflatable curtain-like gas bag covering at least one side window of said vehicle to at least a major extent in an unfolded inflated state of said gas bag and being attached to said vehicle at fastening points, an elongated guide device having two stationary fastening ends at which said guide device is fixed to the vehicle, said gas bag being displaceably fastened to said guide device and said gas bag being movable along at least a portion of said guide device due only to inflation of said gas bag;

said portion of said guide device along which said gas bag moves being arranged behind a lining in a folded state of said gas bag and extending downwardly along a vehicle column in the unfolded and in the folded state of said gas bag, said guide device being constructed so as to be so flexible that said gas bag draws said portion of said guide device along which said gas bag moves out from said lining on inflation of said gas bag, and said gas bag being tensioned between its fastening points and said guide device when inflated.

\* \* \* \* \*